| United States Patent [19] | [11] Patent Number: 4,548,711 |
|---|---|
| Coombs et al. | [45] Date of Patent: Oct. 22, 1985 |

[54] SOLVENT EXTRACTION

[75] Inventors: Daniel M. Coombs; Edward G. Latimer, both of Bartlesville, Okla.

[73] Assignee: Phillips Petroleum Company, Bartlesville, Okla.

[21] Appl. No.: 414,111

[22] Filed: Sep. 2, 1982

[51] Int. Cl.$^4$ .................... C10C 3/08; C10G 21/00; C10G 21/30

[52] U.S. Cl. .................... 208/309; 208/251 R; 196/14.52

[58] Field of Search .................... 208/309, 251 R; 196/14.52

[56] References Cited

U.S. PATENT DOCUMENTS

| 2,145,852 | 2/1939 | Bahlke et al. | 208/309 |
|---|---|---|---|
| 2,166,160 | 7/1939 | King | 196/13 |
| 2,570,044 | 10/1951 | Benedict et al. | 208/309 |
| 2,940,920 | 6/1960 | Garwin | 208/45 |
| 2,950,244 | 8/1960 | Lawsa, Jr. | 208/309 |
| 3,472,760 | 10/1969 | Paterson | 208/309 |
| 3,507,777 | 4/1970 | Hemminger | 208/309 |
| 3,799,871 | 3/1974 | Sequeira, Jr. | 208/324 |
| 3,843,328 | 10/1974 | Basanac | 196/14.52 |
| 3,969,196 | 7/1976 | Sozel | 203/49 |
| 3,972,807 | 8/1976 | Uitti et al. | 208/309 |
| 4,073,719 | 2/1978 | Whismon et al. | |
| 4,088,540 | 5/1978 | Bunas | 208/309 |
| 4,101,415 | 7/1978 | Crowley | 208/45 |
| 4,239,616 | 12/1980 | Gearhart | 208/309 |
| 4,290,880 | 9/1981 | Leonard | 208/309 |
| 4,395,330 | 7/1983 | Aubou et al. | 208/309 |

FOREIGN PATENT DOCUMENTS

| 880074 | 12/1979 | Belgium . | |
|---|---|---|---|
| 0030802 | 3/1977 | Japan | 208/309 |
| 1495722 | 12/1977 | United Kingdom . | |

*Primary Examiner*—D. E. Gantz
*Assistant Examiner*—Helane Myers
*Attorney, Agent, or Firm*—L. M. Lavin

[57] ABSTRACT

The upgrading of heavy, high-metals content oils is optimized when certain solvent mixing and countercurrent flow techniques and/or certain solvent/feed ratios and/or certain extractor internals and extraction residence times are employed.

14 Claims, 13 Drawing Figures

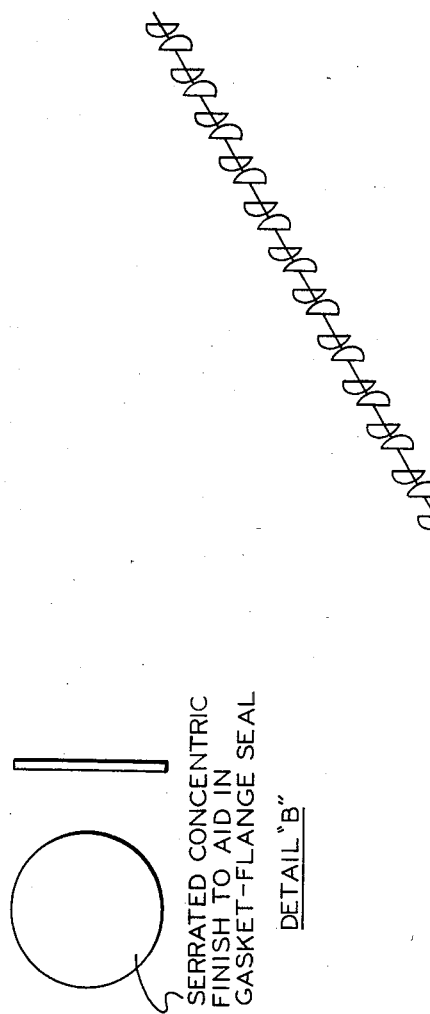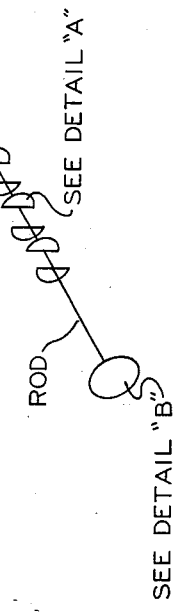
FIG. 13 SEGMENTAL-BAFFLE INTERNALS USED IN PILOT PLANT EXTRACTOR
27 SEGMENTAL BAFFLE PLATES (TYPICAL) DETAIL "A"
DETAIL "B" SERRATED CONCENTRIC FINISH TO AID IN GASKET-FLANGE SEAL

SOLVENT EXTRACTION

BACKGROUND

Heavy oils, such as high-metal content crudes and resids, are under investigation as sources for valuable hydrocarbons. The upgrading of these oils can be accomplished via processes such as solvent extraction to remove metals and other impurities therefrom. Improvements in the subcritical or supercritical solvent extraction of such oils are increasing the viability of these carbonaceous materials as sources of hydrocarbons. These improvements are specifically aimed at upgrading heavy crude oils so that high yields of extract product can be refined by conventional catalytic technology such as resid hydrodesulfurization and catalytic cracking.

INVENTION

The yield and demetallization of product oil from heavy high-metal content oil are optimized by solvent extractions which employ either or all of techniques (A), (B) and (C) as follows: (A) premixing of a minor amount of the solvent with feed and using countercurrent flow for the remaining solvent; (B) use of certain solvent/feed ratios; and (C) use of segmental baffle tray extraction column internals and the proper extraction column residence time.

OBJECTS OF THE INVENTION

It is an object of the invention to provide for the demetallization and general upgrading of heavy oil via a solvent extraction process.

It is another object of the invention to improve the efficiency of solvent extraction operations so that higher product yields of acceptable extract oil quality are attained while maintaining economy in the use of solvents.

ADVANTAGES

The first embodiment of this invention is that the solvent premix/countercurrent flow feature of the invention substantially improved extractions where temperatures and pressures above the critical point of the solvent were used. By using this technique, a greater yield of extract oil can be obtained at the same metals content or a lower metals-containing extract oil product can be obtained at the same yield. Furthermore, the premixing of part of the solvent with the feed before countercurrent extraction gives high extract oil yields and high quality demetallization.

A second embodiment of this invention is that the solvent/feed ratio feature of the invention improved the economics of supercritical extraction operations. The lower solvent/feed ratios of the invention substantially lower the capital and operating costs for such processes while not suffering a loss in selectivity for metals rejection.

A third embodiment of this invention is that the column internals and residence time feature of the invention further improved the extractor metals rejection at a constant yield or allowed for an increase in extract oil yield at a constant extract oil metals content.

Other objects and advantages of the invention will be apparent from study of specification and drawings.

BRIEF DESCRIPTION OF THE FIGURES

Other objects of the present invention will be apparent upon considering the following description of the present invention along with the drawings wherein:

FIG. 13 diagrammatically shows a sketch of the half segmental baffle internal tray design which showed itself to be best in the feed oil residence time experimentally obtained in FIGS. 11 A, B and C.

DESCRIPTION OF THE INVENTION

Process Description

Figure 1:
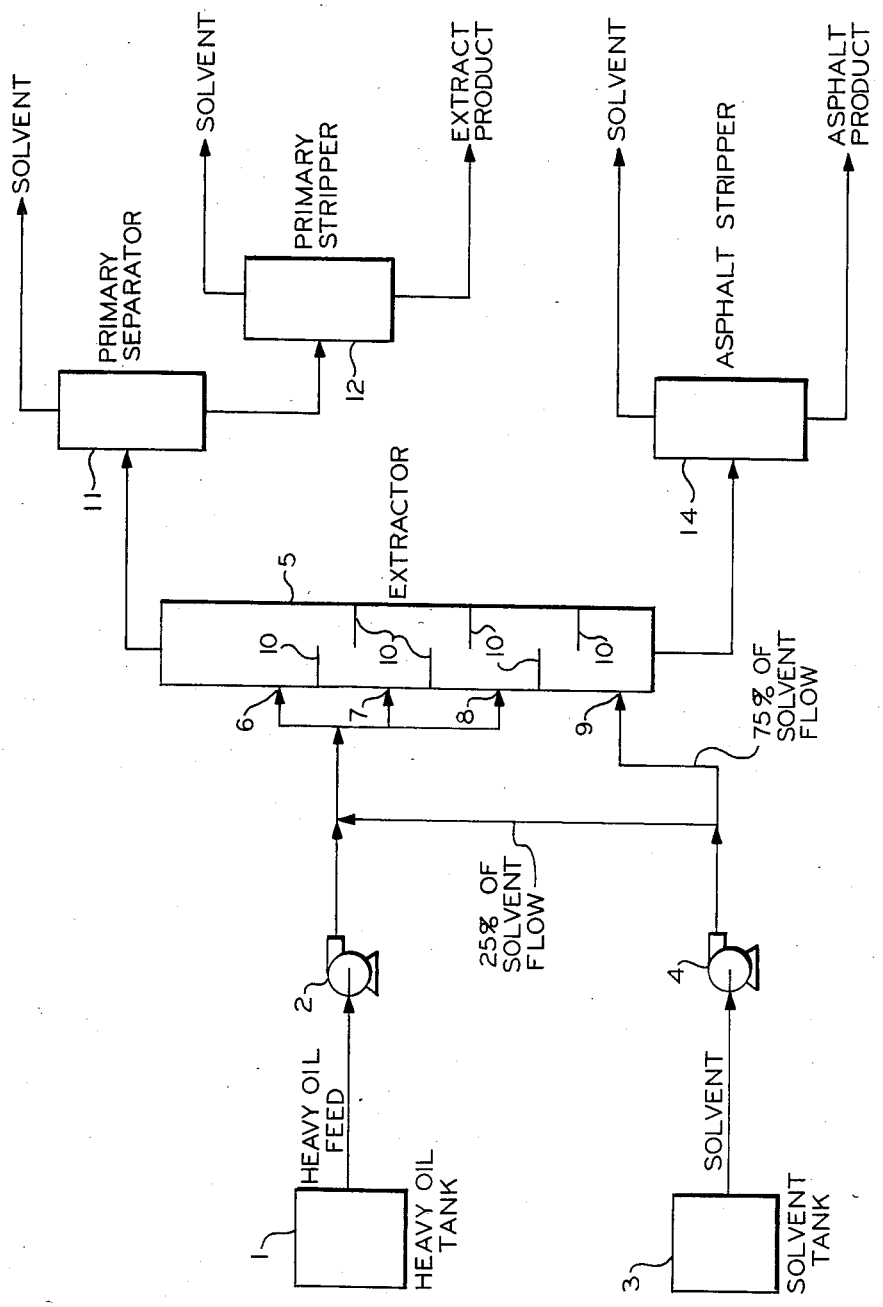
FIG. 1 diagrammatically illustrates an arrangement of apparatus which suitably carried out the invention in continuous operation in accordance with three embodiments of the present invention.
Figure 2:
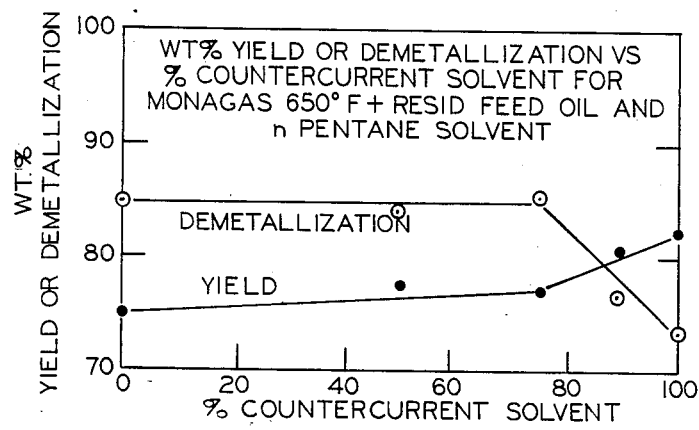
FIG. 2 graphically illustrates the first embodiment of optimum countercurrent solvent effect upon extract oil yield and extract oil demetallization at supercritical conditions for Monagas 650° F.+ residuum feed oil and with n-pentane solvent at about 75 percent countercurrent solvent flow.
Figure 3:
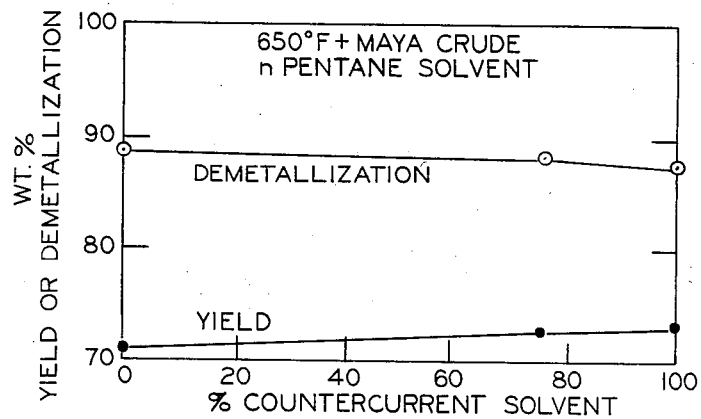
FIG. 3 graphically illustrates also for supercritical extraction the effect upon yield and demetallization of extract oil as countercurrent solvent flow in the extraction column traversed 0 to 100 percent with the optimum yield and demetallization occurring at about 75 percent countercurrent solvent for Maya 650° F.+ resid with n-pentane solvent.
Figure 4:
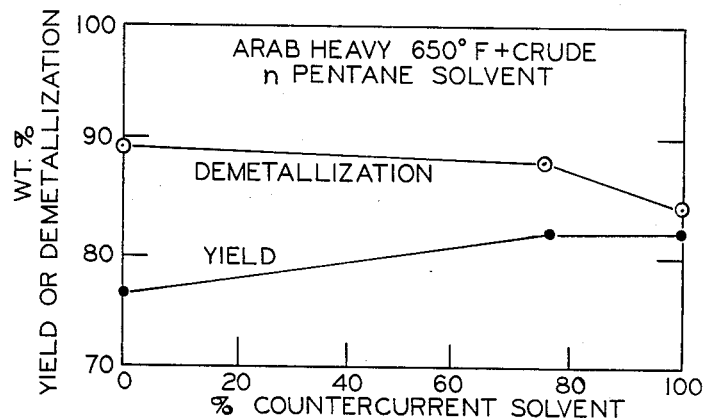
FIG. 4 likewise graphically illustrates for supercritical extraction for Arab Heavy 650° F.+ resid using n-pentane solvent the effect upon yield and demetallization of the extract oil to achieve an optimum yield and demetallization at about 75 percent flow of solvent in a countercurrent fashion.

The accompanying flow diagram FIG. 1 of the heavy oil extraction process illustrates the invention. From a heavy oil storage tank 1, heavy oil is pumped via pump 2 and mixed with a portion of hydrocarbon solvent such as n-pentane from solvent tank 3 and high pressure solvent pump 4 or from recycle of solvent from the primary separator 11 overhead. This portion of the total solvent found to be optimum is about 25 percent of the total solvent to the extraction column. Said optimum is the first of three embodiments of this invention. This solvent portion is premixed with the feed oil prior to entry at one of a plurality of feed locations 6, 7 or 8 along the extractor. The remainder of the solvent (about 75 percent) is fed to the bottom 9 of the column 5 in essentially countercurrent flow to the mixture of feed oil and 25 percent of total solvent fed to a higher portion of the extractor. It is preferred that the contactor be a continuous extraction column or a similar device having upper, intermediate, and lower portions or regions. Suitable devices include alternating segmental baffled columns, packed columns, open columns, mixer-settler vessels arranged in a countercurrent flow pattern, or York-Scheibel extraction columns, or other similar devices. In the York-Scheibel type, the extractor column contains a plurality of impellers on a vertical shaft surrounded by shroud baffles (horizontal and stationary) with optional wire mesh packed between said impellers.

Once a minor amount of the solvent has been blended with the heavy oil feed, that blend or mixture is introduced into the upper or intermediate portion of the contactor. The remaining portion of the solvent is added in the lower portion of the contactor, near its bottom. The light phase in the extractor consists of solvent and extracted oil components. This effluent of solvent and upgraded oil product is removed as the principal effluent from the upper portion, near the top of the extractor 5. Raffinates and other undesirable products are removed from the lower portion, i.e., at or near the bottom of the extractor 5 as an asphaltic type material.

The carbonaceous feeds employed in the process of the invention are generally heavy oils and resids having high metals contents. Typically they are crudes or residuums such as Monagas atmospheric or vacuum resid or visbroken product. Other feedstocks that could be used can be produced from Maya, heavy Californian, heavy Canadian or any other heavy crude oil by atmospheric or vacuum distillation or mild thermal cracking and fractionation techniques. A preferred carbonaceous feed would contain over 100 ppm nickel and vanadium contaminant metals and have an initial boiling point of greater than about 500° F. Typical oil feedstock properties are given in Table I.

The temperature and pressure employed in the extraction apparatus depends upon such parameters as the solvent, feed oil and type of extraction apparatus used. When subcritical extraction is used, temperatures on the order of about 0° to 200° F. below the critical temperature of the solvent are employed. Typical temperatures will be about 200° to 500° F. Typical pressures employed for subcritical extraction operations will be between about 500 to 1000 psig with a pressure of about 50 psig greater than the critical pressure of the solvent being preferred.

TABLE I

| Feed Oil | Oil Feedstock Properties | | | | |
|---|---|---|---|---|---|
| | Ni, ppm | V, ppm | Rams, wt % | S, wt % | API @ 60 F |
| Monagas 650 F. + | 120 | 480 | 14.9 | 3.6 | 7.3 |
| Maya 650 F. + | 90 | 460 | 17.2 | 4.7 | 8.3 |
| Arab Heavy 650 F. + | 30 | 100 | 12.7 | 4.5 | 11.6 |

The critical temperature of a substance is the temperature at or above which it cannot be liquified regardless of changes in pressure. Thus, critical temperature depends upon the nature of the solvent employed. Extractions carried out above the critical temperature of the solvent employed are known as supercritical extractions. Supercritical extractions are preferred to enable the attainment of greater yields of extract product with lower critical temperature solvents. These high yields cannot be conveniently attained with subcritical extractions because the rejected asphaltic material becomes too viscous and difficult to handle as a liquid at the subcritical extraction temperatures employed. Lower critical temperature solvents are used because it is well known in the art that they are more selective, producing lower metals extract product at comparable yields. The use of supercritical solvents can also improve the mass transfer characteristics of the extraction, allow for the use of less solvent, and allow for an energy efficient separation during solvent recovery. Suitable temperatures for supercritical extractions in accordance with the invention will be from about 230° to 650° F. For example, a range of between 390° to 440° F. would be preferred for n-pentane as the solvent. Pressures for supercritical operations would be about 100 to 500 psig above the critical pressure of the solvent employed. For example, for n-pentane as the solvent, pressures preferred for supercritical extraction would be from 600 to 1000 psig.

Solvents to be employed in the extraction operation of the invention are those having adequate compatibility with the hydrocarbons to be extracted, i.e., the upgraded extract product oils. Suitable solvents include propane, n-butane, i-butane, and normal and branched pentanes, hexanes and heptanes, and the like. Mixtures of solvents can be used.

In the preferred embodiment of this invention the extractor is operated with 3.5 to 5 parts by weight of total hydrocarbon solvent to feed oil with from 70 to 80 percent of this solvent being fed countercurrently. Also in the preferred embodiment of this invention the extractor should be operated above the critical temperature and pressure of the solvent used and the extraction column should contain segmental baffle internals to help maximize the yield and demetallization of the extract product oil.

A typical arrangement of the apparatus is shown in FIG. 1.

The extract oil and solvent mixture pass overhead from the extractor column 5. The remaining asphaltenes and resins comprise the asphalt product and pass out the bottom of the column as raffinate. The overhead solvent-extract product mixture is throttled to a lower pressure into a primary separator 11 where the pressure drop effects a separation by oil solubility decrease of the solvent and the extract product containing a small amount of solvent. Alternately the pressure can be decreased by a smaller amount with heat added to effect a separation by oil solubility decrease of the solvent and extract product containing a small amount of solvent. A combination of heat addition and moderate pressure drop can also be employed to achieve this separation. The overhead solvent from separator 11 can contain a small amount of extracted oils and is recycled to the extraction column preferably after some form of heat recovery step. The primary separator extract product oil containing a small amount of solvent is then stripped in a primary stripper 12. Additional solvent is stripped overhead by flashing and can be recycled to the solvent tank 3. Steam or another inert material can be used to assist in the stripping operation as is widely known by those skilled in the art. Product extract oil, essentially solvent free, exits from the bottom of the primary stripper 12. Typical operating conditions for the primary stripper would range from 400° to 550° F. and 10 to 200 psig depending on the solvent employed. For example, for n-pentane and Monagas extract product the primary stripper is operated at between 400° to 500° F. and 20 to 40 psig. The operation of recovery of extract product by pressure decrease or heat increase from the extractor can be carried out in a number of stages if desired. Each stage will produce a progressively higher quality product. Specialized uses for these products can exist.

Raffinate (bottoms product from the extractor) is sent to an asphalt product stripper 14. The function and operation of this stripper is analogous to the primary stripper described in the preceding paragraph. Typical operating conditions would range from 450° to 650° F. and from 10 to 200 psig depending upon the feedstock and solvent used and the extract product yield. For example, with n-pentane the asphalt product stripper 14 could be operated at 100 psig and 550° F. In general, higher pressures and temperatures are preferred for the asphalt stripper compared to the primary stripper due to the increased viscosity of the asphalt product and the desire to discharge this material to the product handling facilities without the use of a pump.

Premixing and Countercurrent Flow

There are at least three basic methods to introduce solvent for liquid-liquid or supercritical heavy oil extraction processes. They are specifically mix-settle solvent flow, countercurrent solvent flow or a combination of both methods. Using mix-settle solvent flow, fresh solvent and feed oil are mixed together and fed to the extractor column at the same point. Using countercurrent solvent flow, fresh solvent and feed enter at different points with the countercurrent solvent always entering below the oil feed point giving countercurrent differential concentration gradients, multi-stage operation and, thus, large concentration differences as a driving force within the extractor.

It is advantageous to mix some of the solvent with the feed oil in a mix-settle or single contact fashion and to feed the remainder of the solvent in a countercurrent fashion for supercritical extraction of heavy oils. Specifically, we have discovered that for many heavy feedstocks 70 to 80 percent countercurrent solvent provided the optimum extraction results.

The data of FIGS. 2, 3, 4 and 5 was produced from several experimental runs on a heavy oil extraction pilot plant similar in design to that of FIG. 1. The details of these experimental runs are given in EXAMPLE I. For Monagas, Maya and Arab Heavy atmospheric resid feedstocks, FIGS. 2, 3 and 4 have shown a break point in yield and demetallization to occur at about 75 percent countercurrent solvent flow.

Figure 5:
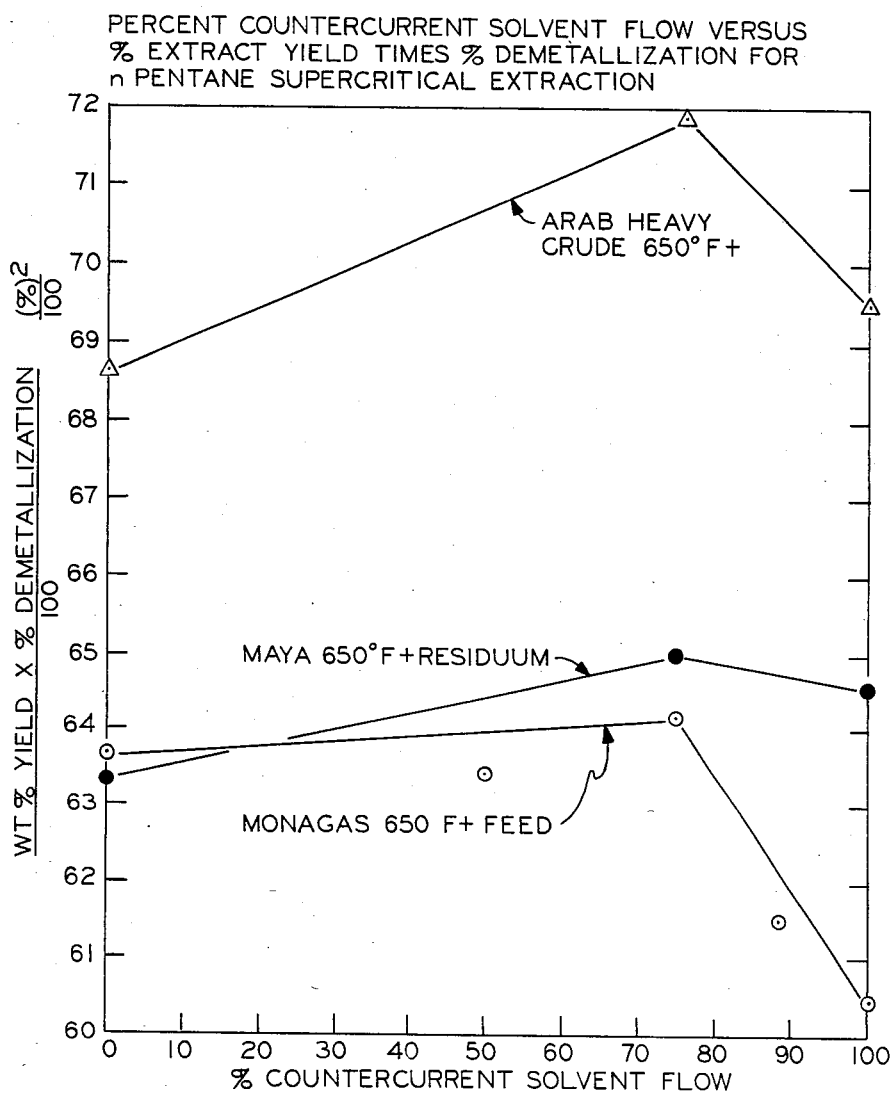
FIG. 5 more distinctly illustrates the teachings of FIGS. 2, 3 and 4 by graphically showing for supercritical extraction the effect of percent yield of extract oil times percent demetallization of extract oil/100 versus percent countercurrent flow with distinct maximums at about 75 percent flow of countercurrent solvent.

The data of FIG. 5 summarized the effect of the percentage of solvent fed countercurrently for these three atmospheric resid feedstocks. In our process, the objective is to obtain a high yield of extract product at a high demetallization. An elementary method to examine the selectivity of the extraction process is to compare the product of extract yield times demetallization for the different amounts of countercurrent solvent employed. Basically, the higher this product is, the more selective is the extraction process. Monagas, Maya and Arab Heavy atmospheric resids all had a peak in extraction selectivity at about 75 percent countercurrent solvent in FIG. 5.

Solvent/Feed Ratio

When supercritical extraction is carried out, the efficiency of the process is optimized when certain solvent to carbonaceous feed ratios are employed. Generally, for standard liquid-liquid extraction methods, higher demetallization is attained at higher solvent/feed ratios, until the solvent/feed ratio reaches from about 7.5/1 to 10/1 by weight where any additional solvent is not necessary. We have discovered, however, that for supercritical extraction of heavy oils solvent/feed ratios above 4/1 to 5/1 by weight are not necessary. We have further discovered that for some feedstocks solvent/feed ratios above 3/1 by weight do not yield any additional benefit and that solvent/feed ratios as low as 2/1 by weight can be effectively employed. The use of these lower solvent/feed ratios in our supercritical extraction process to produce high yields of demetallized extract product was determined to be a significant advantage.

Figure 6:
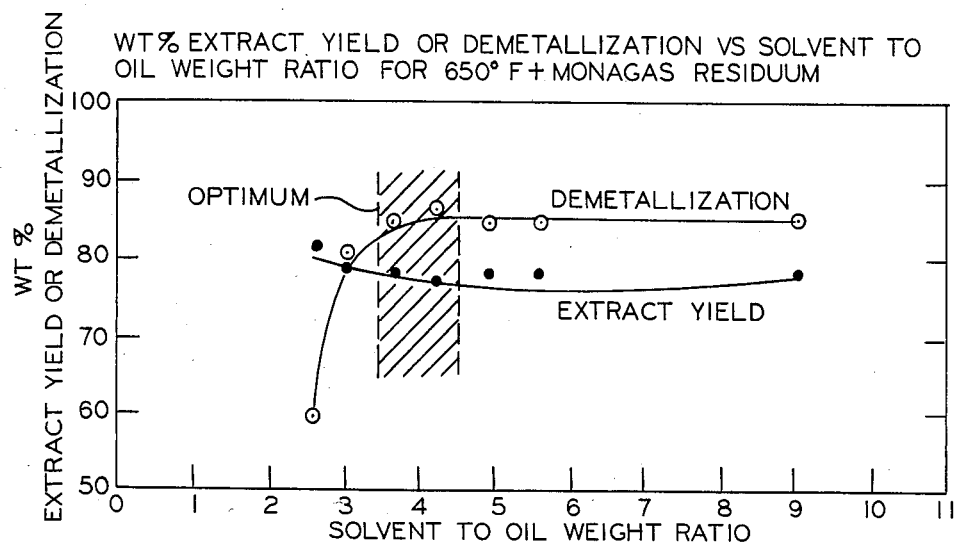
FIG. 6 graphically illustrates for supercritical extraction the second embodiment of optimum solvent to feed oil weight ratio of about 3.5 to 4.5 by showing experimentally the effect of solvent to oil ratio upon extract oil yield and demetallization for 650° F.+ Monagas residuum.
Figure 7:
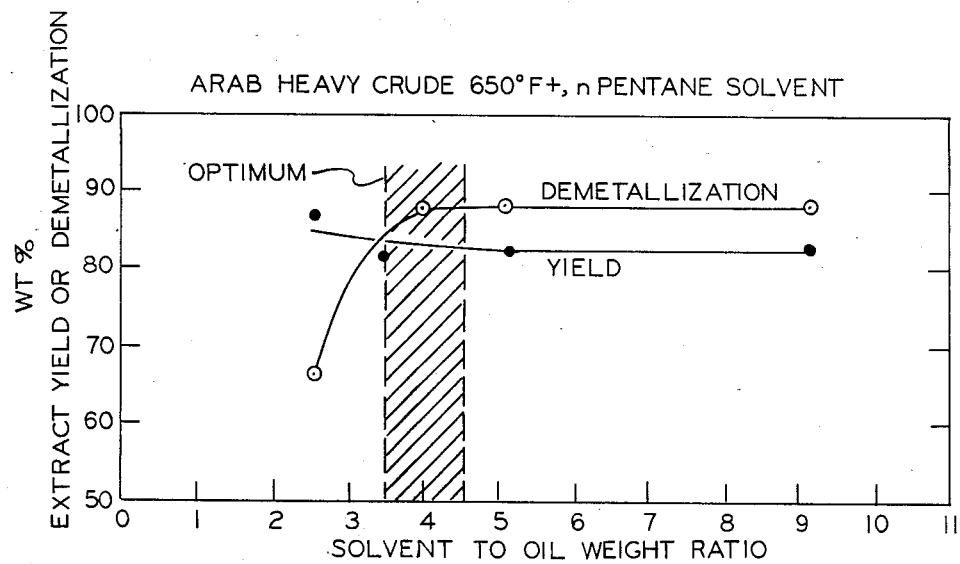
FIG. 7 also grapically illustrates for supercritical extraction the second embodiment of optimum solvent to feed oil ratio experimental results of removing extract oil and metals from Arab 650° F.+ resid with n-pentane solvent.
Figure 8:
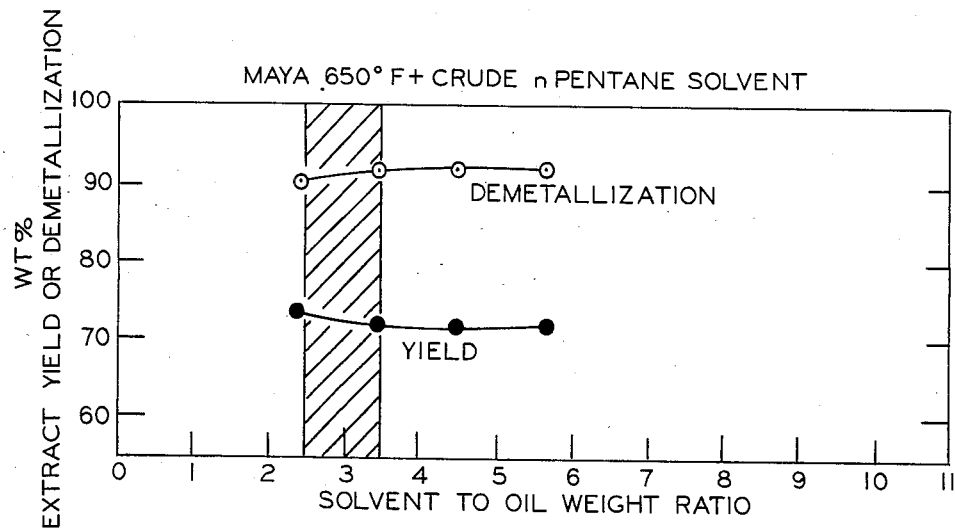
FIGS. 8 and 9 likewise graphically show for two feed oil samples of Maya 650° F.+ resid and pentane solvent the effect at about 2.5 to 3.5 solvent to feed oil weight ratio to maximize yield and demetallization of extract oil in supercritical extractions.
Figure 9:
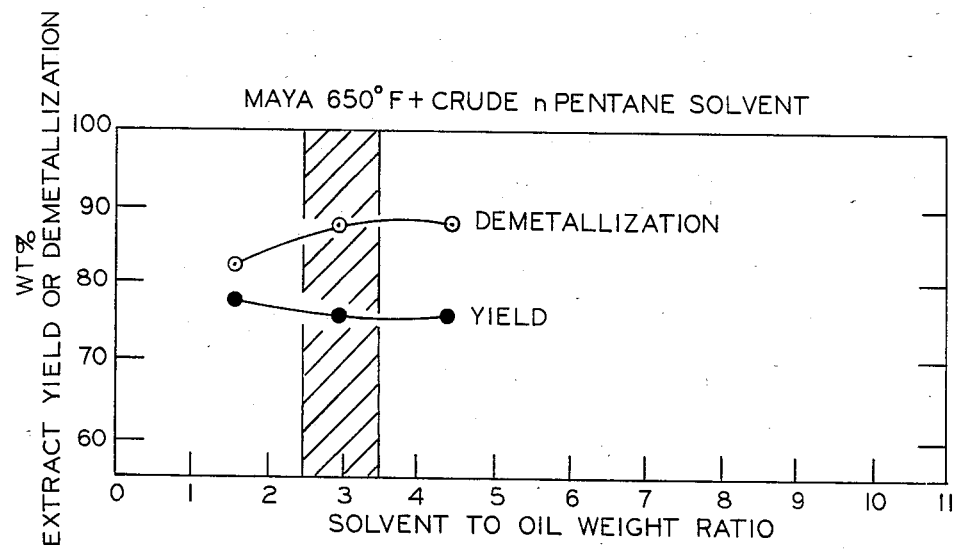

FIGS. 6, 7, 8 and 9 show the solvent to feed oil ratio versus extract product yield and demetallization results obtained for Monagas 650 F.+, Arab Heavy 650 F.+, Maya 650 F.+, and Maya 650 F.+ feed oils respectively. A number of experimental runs using the apparatus of FIG. 1 wherein the solvent to feed oil ratio was varied over a wide range was used to provide the data for these figures. The conditions and methods used to produce these results are covered within Example II. The data of FIGS. 6, 7, 8 and 9 showed that as the solvent/feed ratio was further dropped a point was reached where extract product yield began to increase while demetallization began to decrease. In general, a point is reached where the demetallization decline is larger than the yield increase and a further decrease in solvent/feed ratio below this "optimum" region was found to be uneconomical. The data of FIGS. 6 and 7 showed that this optimum solvent/feed ratio region occurred for Monagas and Arab Heavy atmospheric residuums at between 3.5/1 to 4.5/1 by weight. Basically, there was no advantage to using a solvent/feed ratio of greater than 4.5/1 for these feeds. The data of FIGS. 8 and 9 showed that this optimum solvent/feed ratio region occured for Maya atmospheric resid at between 2.5/1 to 3.5/1 by weight. Basically there was no advantage to use a solvent/feed ratio of greater than 3.5/1 for this feed.

Figure 10:
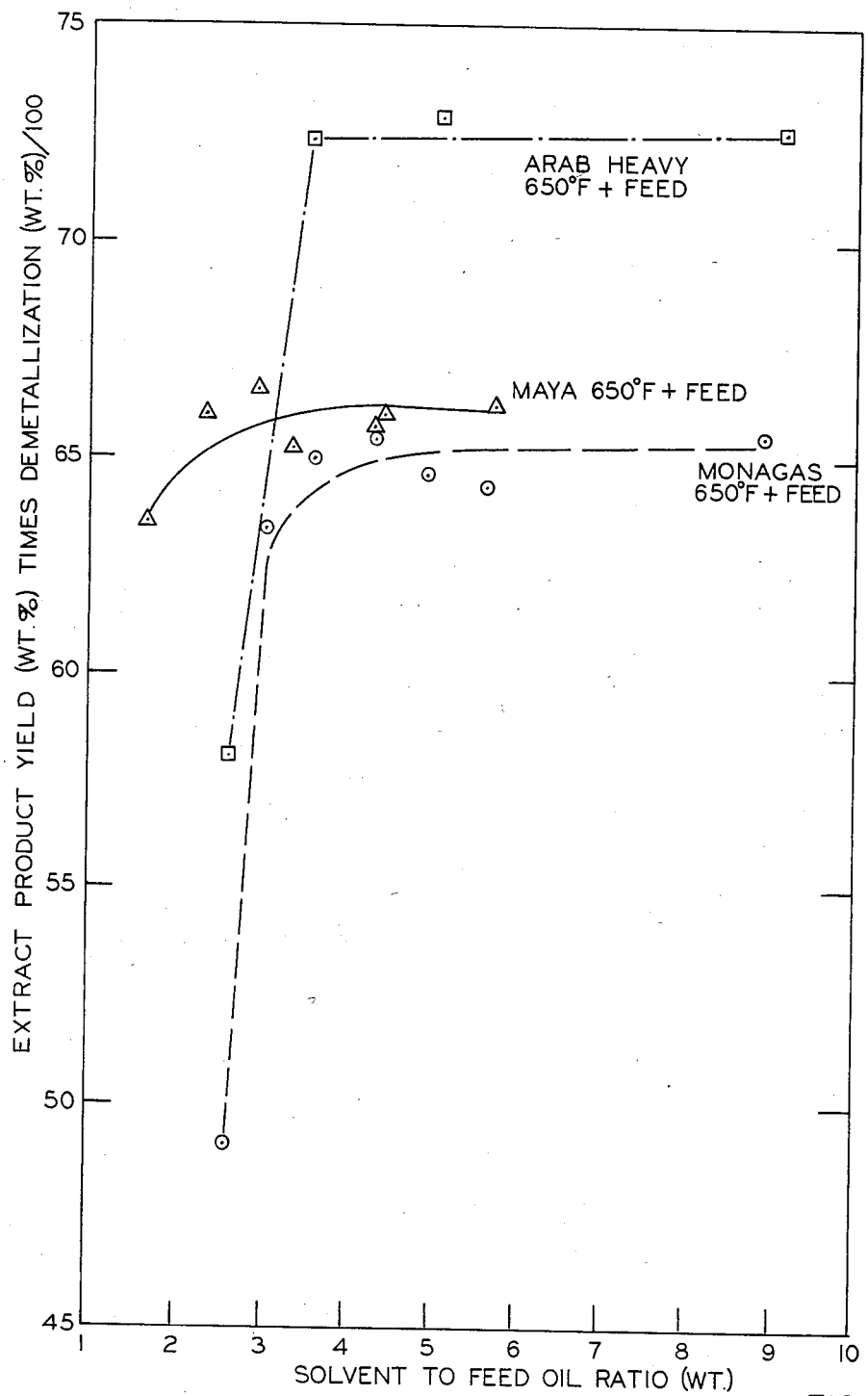
FIG. 10 more distinctly illustrates the teachings of FIGS. 6, 7, 8 and 9 by graphically showing the effect of percent yield of extract oil times percent demetallization/100 versus solvent to feed weight ratio for the supercritical experimental data of said figures. The optimum is the lowest solvent to feed oil weight ratio at sustained high values of yield and demetallization. This is shown in the range of 2.5 to 4.5 solvent to feed weight ratio.

The data of FIG. 10 summarized the effect of the solvent/feed oil ratio for the three heavy atmospheric residuums. In our process, the objective is to obtain a high yield of extract product at a high demetallization. An elementary method to examine the selectivity of the extraction process is to compare the product of yield times demetallization for different solvent/feed ratios. Basically the higher this product is, the more selective will be the extraction. FIG. 10 demonstrated a clear loss in selectivity for Monagas and Arab Heavy resids below a solvent/feed ratio of 3.5/1 by weight. For the Maya resid, the selectivity break was not as sharp but basically occurred below a solvent/feed ratio of 2.5/1 by weight. Again, solvent/feed ratios of around 2.5 to 4.5/1 by weight offer a significant advantage to prior art solvent/feed ratios of between 7.5/1 to 10/1 by weight.

Optimum Extraction Column Internals and Residence Time

For supercritical extraction of heavy crudes and resids, a segmental baffle tray extraction column was found to be superior to a packed or open (no internals) extraction column at a range of residence times from 10 to 40 minutes. Also, for the process, the extract product yield was found to increase as the extraction column residence time decreased.

Figure 11:
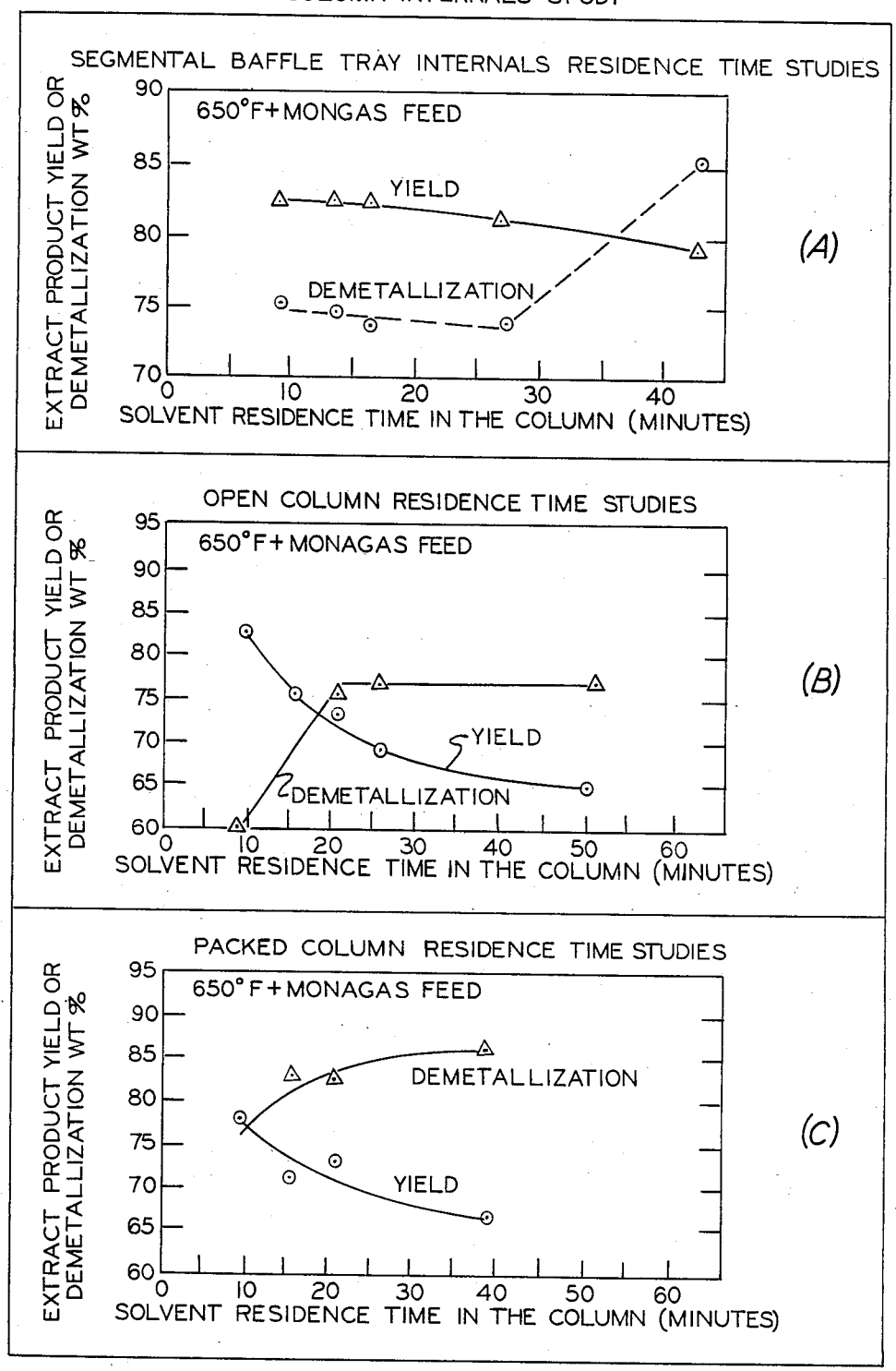
FIGS. 11 A, B and C graphically show the third embodiment, that of the effect of both residence time and an extraction column with segmental tray baffles, an open column with no trays or internals and a packed column with Intallox 25 mm saddles, respectively, upon weight percent yield and weight percent demetallization of extract oil product which was extracted from a Monagas 650° F.+ resid using n-pentane solvent.

By examination of FIGS. 11 A, B and C, one can see that for all three type internals the extract product yield increased so the solvent residence time in the column decreased. Surprisingly, however, the yield of extract product only fluctuated by about 3 weight percent for the segmental baffle tray column between a column residence time of 40 to 10 minutes while for the open and packed columns the extract product yield fluctuated widely by 15.5 weight percent and 11 weight percent respectively for these other two type of column internals. Thus, the segmental baffle extractor column offers an advantage for commercial use due to the higher turndown capabilities without the necessity to widely vary operating conditions to attain a given extract product yield and quality.

Figure 12:
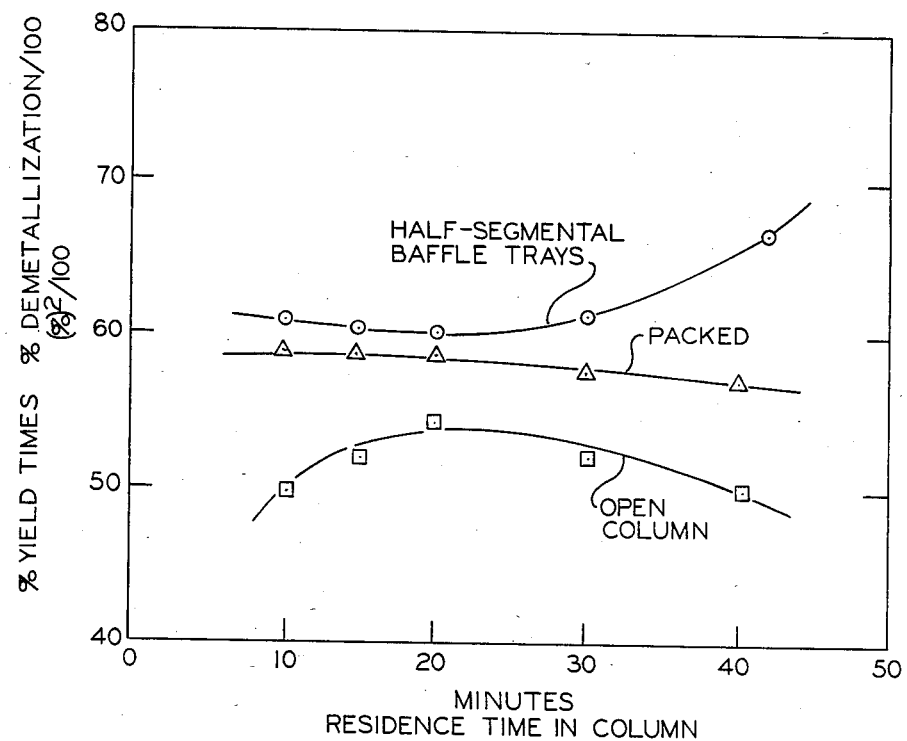
FIG. 12 more distinctly than FIGS. 11 A, B and C shows the efficiency of half segmental baffle trays over packed or open extractors by graphing percent yield of extract oil times percent demetallization of extract oil/100 versus residence time in the various columns.

By examination of FIG. 12 another distinct advantage of the segmental baffle column is evident. In the process, our objective is to obtain a high yield of extract product at a high demetallization. An elementary method to examine the selectivity of the extraction process is to compare the product of yield times demetallization for the different internals. Basically the higher this product is, the more selective the extraction process will be. From FIG. 12, again, surprisingly the segmental baffle column was found to be superior for extraction selectivity at all solvent column residence times studied.

Thus, a segmental baffle column for supercritical extraction of heavy crudes and resids has offered greater flexibility and utility for commercial operation because these internals have demonstrated lower sensitivity and higher selectivity. FIG. 13 is a sketch of the segmental baffle internals used for the study. The three holes on the trays prevented the build-up of heavy material while the alternating arrangement in the column established an excellent flow pattern.

A number of experimental runs using the apparatus of FIG. 1 wherein the column internals were varied was used to provide the data for FIGS. 11 and 12. The conditions and methods used to provide these results are covered within Example III.

EXAMPLES

Examples I, II and III illustrate the three primary advantageous features of this invention for the supercritical extraction of heavy residual oil materials. Namely, that 70 to 80 percent countercurrent solvent flow, solvent/feed oil ratios of from 2.5 to 4.5 by weight and segmental-baffle extractor internals all provided for greater extract product yields and demetallization, greater economy in the use of solvents, and greater economy in the overall extraction process. The use of solvents above their critical temperatures and pressures were employed to maximize the operability, demetallization, and economy of high yield extraction from these heavy residuals. High yield extractions are those that specifically extract very near the limit of n-pentane soluble material present in the feedstock (n-pentane insolubles are commonly known as asphaltenes). Extracting to near the limit of the asphaltenes present maximizes the yield of high value refinable extract while minimizing the size of the low value asphalt product produced.

The data for Examples I, II and III were all provided using a heavy oil extraction pilot plant as described by FIG. 1. For consistency and understanding, n-pentane solvent was used along with atmospheric residual heavy oil produced from Monagas, Maya and Arab Heavy crudes. The use of these feed oils covered a wide range of heavy oil properties. The use of this solvent or these particular feed oils in no way limits the scope of this invention. The extraction column used for this work was a nominal 4 inch diameter, 12 foot long column. The column primary separator, primary stripper, and asphalt product stripper were all operated continuously. The results presented by Examples I, II and III represent the steady state results of operating this equipment for the different run conditions given. Unless otherwise stated by the particular example, the column was packed with alternating segmental baffle internals spaced 4 inches apart, 75 percent countercurrent solvent was used, and all percentages given are in weight percent.

TABLE II

Supercritical n-Pentane Extractions With Varying Percentage of Countercurrent Solvent

| | Extractor Conditions | | | % | Results | | Extract Oil Properties | | |
|---|---|---|---|---|---|---|---|---|---|
| Feed | Top Temp. °F. | Pressure, psig | Solvent to Feed Oil Ratio Wt. | Countercurrent Solvent | Extract Yield Wt. % | Demetallization Wt. % | Ni + V ppm | Carbon Residue Rams, Wt. % | Run No. |
| 650 F. + Monagas | 424 | 800 | 5.1 | 75 | 77.1 | 85.2 | 115.1 | 5.7 | 60 |
| 650 F. + | 424 | 800 | 5.0 | 100 | 82.1 | 73.6 | 192.8 | 7.3 | 61 |

TABLE II-continued
Supercritical n-Pentane Extractions With Varying Percentage of Countercurrent Solvent

| | Extractor Conditions | | | | Results | | Extract Oil Properties | | |
|---|---|---|---|---|---|---|---|---|---|
| Feed | Top Temp. °F. | Pressure, psig | Solvent to Feed Oil Ratio Wt. | % Countercurrent Solvent | Extract Yield Wt. % | Demetallization Wt. % | Ni + V ppm | Carbon Residue Rams, Wt. % | Run No. |
| Monagas 650 F. + | 424 | 800 | 4.9 | 50 | 77.2 | 83.5 | 128.3 | 5.7 | 62 |
| Monagas 650 F. + | 424 | 800 | 4.8 | 0 | 74.9 | 84.6 | 123.2 | 5.3 | 63 |
| Monagas 650 F. + | 424 | 800 | 4.9 | 88 | 80.2 | 77.0 | 172.0 | 6.9 | 78-A |
| Monagas 650 F. + | 424 | 800 | 8.1 | 75 | 73.0 | 88.9 | 83.6 | 5.1 | 189 |
| Maya 650 F. + | 424 | 800 | 4.8 | 100 | 73.6 | 87.9 | 91.4 | 5.4 | 190 |
| Maya 650 F. + | 424 | 800 | 7.2 | 0 | 71.2 | 89.1 | 84.3 | 5.3 | 191 |
| Maya Arab Heavy 650 F. + | 424 | 800 | 3.7 | 100 | 82.4 | 84.4 | 24.6 | 4.6 | 268 |
| Arab Heavy 650 F. + | 424 | 800 | 3.7 | 0 | 76.6 | 89.6 | 17.7 | 5.9 | 269 |
| Arab Heavy 650 F. + | 424 | 800 | 4.8 | 75 | 81.5 | 88.2 | 18.9 | 4.3 | 276 |

TABLE III
Supercritical n-Pentane Extractions with Varying Solvent to Oil Ratio

| | Extractor Conditions | | | | Results | | Extract Properties | | |
|---|---|---|---|---|---|---|---|---|---|
| Feed | Top Temp. °F. | Press. psig | Solvent to Feed Oil Ratio Wt. | Percent Countercurrent Solvent | Extract Yield Wt. % | Demetallization Wt. % | Ni + V ppm | Carbon Residue Rams, Wt. % | Run No. |
| Monagas 650 F. + | 420 | 800 | 8.9 | 75 | 77.2 | 85.0 | 116.4 | 5.6 | 53 |
| Monagas 650 F. + | 420 | 800 | 5.6 | 75 | 70.4 | 84.3 | 123.2 | 5.7 | 54 |
| Monagas 650 F. + | 420 | 800 | 4.9 | 75 | 76.0 | 85.1 | 117.6 | 5.6 | 55 |
| Monagas 650 F. + | 420 | 800 | 4.3 | 75 | 75.7 | 86.5 | 107.0 | 6.0 | 56 |
| Monagas 650 F. + | 420 | 800 | 3.6 | 75 | 76.8 | 84.6 | 120.2 | 6.4 | 57 |
| Monagas 650 F. + | 420 | 800 | 3.0 | 75 | 78.6 | 80.5 | 148.8 | 7.4 | 58 |
| Monagas 650 F. + | 420 | 800 | 2.6 | 75 | 82.3 | 59.6 | 294.7 | 8.5 | 59 |
| Arab Heavy 650 F. + | 424 | 750 | 5.1 | 75 | 82.5 | 88.5 | 18.1 | 4.5 | 243 |
| Arab Heavy 650 F. + | 424 | 750 | 9.1 | 75 | 82.9 | 87.7 | 19.3 | 4.7 | 244 |
| Arab Heavy 650 F. + | 424 | 750 | 3.5 | 75 | 82.3 | 88.0 | 19.0 | 4.8 | 245 |
| Arab Heavy 650 F. + | 424 | 750 | 2.6 | 75 | 87.4 | 66.5 | 49.8 | 7.4 | 247 |
| Maya 650 F. + | 412 | 650 | 5.7 | 75 | 72.1 | 92.0 | 60.7 | 4.4 | 198 |
| Maya 650 F. + | 412 | 650 | 3.3 | 75 | 71.1 | 91.9 | 62.6 | 4.3 | 199 |
| Maya 650 F. + | 412 | 650 | 4.4 | 75 | 71.9 | 92.0 | 61.3 | 4.5 | 200 |
| Maya 650 F. + | 412 | 650 | 2.3 | 75 | 73.3 | 90.2 | 73.5 | 4.8 | 201 |
| Maya 650 F. + | 436 | 950 | 4.3 | 75 | 75.2 | 87.5 | 91.5 | 5.4 | 226 |
| Maya 650 F. + | 436 | 950 | 2.9 | 75 | 76.5 | 87.0 | 93.4 | 5.5 | 227 |
| Maya 650 F. + | 436 | 950 | 1.6 | 75 | 77.2 | 82.2 | 117.2 | 6.4 | 229 |

EXAMPLE I

Countercurrent Solvent Flow

Table II contains the actual experimental conditions and results obtained when we extracted Monagas 650 F.+, Maya 650 F.+, and Arab Heavy 650 F.+ residuums with supercritical n-pentane in a continuous pilot plant unit similar to FIG. 1. The percentage of solvent fed countercurrently was varied between 0 and 100 percent for these runs. The data from this Example have been plotted in FIGS. 2, 3, 4 and 5 and showed that yield and demetallization of extract product oil was maximized at about 75 percent countercurrent solvent flow.

EXAMPLE II

Solvent/Feed Ratios

Table III contains the actual experimental conditions and results obtained when we extracted Monagas 650 F.+, Maya 650 F.+, and Arab Heavy 650 F.+ residuums with supercritical n-pentane in a continuous pilot plant similar to FIG. 1. The solvent to feed oil ratio was varied from 1.6 to 9.1 by weight for these runs. The data from this example have been plotted in FIGS. 6, 7, 8, 9 and 10 and showed that high selectivity extractions can be obtained by our process at solvent/feed ratios of less than 4.5/1 by weight. In fact, there is no selectivity advantage to operate at a solvent/feed ratio of greater than 4.5/1 by weight. The Maya resid advantageously operated at solvent/feed ratios below 3.5/1 by weight without a selectively loss. The extraction apparatus used for this Example was the same as that used in Example I.

EXAMPLE III

Column Internals and Residence Time

Table IV contains the actual experimental conditions and results obtained when we extracted Monagas 650 F.+ resid with supercritical n-pentane in three different types of extraction columns. One column contained an alternating arrangement of segmental baffle internals such as those displayed in FIG. 13, a second column contained Intalox ® 25 mm stainless steel tower packing and a third column was left open with no internals. The data from this Example were used to produce FIGS. 11 and 12.

The data showed that the segmental baffle internals produced better extract yield and demetallization results as well as being significantly less sensitive to the column throughput rate. The results also showed that yield of extract product increased as the column residence time decreased for all three types of column internals. The extraction apparatus used for this Example was the same as that used for Examples I and II except for the change in column internals.

The configuration of the segmental baffle internals is shown in FIG. 13. The internals were inserted into extractor 5 shown in FIG. 1. Detail A shows a sketch of a typical perforated segmental baffle plate and Detail B shows the support plate to which the rod was attached and which supported the baffles by being sandwiched between the flanges and the gaskets on top of extractor 5. The rod had 27 half segmental baffles attached to it.

We claim:

1. A process for the solvent extraction of hydrocarbon materials from carbonaceous feeds using a contac-

TABLE IV

| | | Extractor Conditions | | | | Results | | | Carbon | |
| | | | | | Solvent | | | | | |
| | | Top | | Solvent to Feed Oil | Percent Counter- | Residence Time In | Extract Yield, | Demetalli- zation | Extract Ni + V | Residue Rams., | Run |
| Feed | Column Internals | Temp. °F. | Press. psig | ratio, wt. | current Solvent | Column, min | Wt. % | Wt. % | ppm | Wt. % | No. |
|---|---|---|---|---|---|---|---|---|---|---|---|
| Monagas 650 F. + | Alternating Half Baffles | 424 | 800 | 5.0 | 100 | 15.5 | 82.1 | 73.6 | 193 | 7.3 | 61 |
| Monagas 650 F. + | Alternating Half Baffles | 424 | 800 | 4.9 | 100 | 13.0 | 82.4 | 74.7 | 184 | 7.4 | 64 |
| Monagas 650 F. + | Alternating Half Baffles | 424 | 800 | 4.9 | 100 | 8.7 | 82.3 | 75.2 | 181 | 6.9 | 65 |
| Monagas 650 F. + | Alternating Half Baffles | 424 | 800 | 5.0 | 100 | 25.0 | 81.0 | 73.8 | 194 | 6.8 | 66 |
| Monagas 650 F. + | Alternating Half Baffles | 424 | 800 | 6.9 | 100 | 31.0 | 79.1 | 85.1 | 113 | 6.5 | 67 |
| Monagas 650 F. + | Alternating Half Baffles | 424 | 800 | 7.8 | 100 | 31.7 | 78.9 | 82.2 | 135 | 6.0 | 83 |
| Monagas 650 F. + | Open (No Internals) | 424 | 800 | 4.8 | 100 | 20.7 | 73.4 | 75.5 | 200 | 3.3 | 116 |
| Monagas 650 F. + | Open (No Internals) | 424 | 800 | 6.6 | 100 | 25.7 | 69.2 | 77.1 | 198 | 6.8 | 117 |
| Monagas 650 F. + | Open (No Internals) | 424 | 800 | 5.9 | 100 | 51.3 | 65.3 | 75.8 | 222 | 8.3 | 118 |
| Monagas 650 F. + | Open (No Internals) | 424 | 800 | 4.6 | 100 | 9.5 | 82.2 | 59.7 | 294 | 9.3 | 119 |
| Monagas 650 F. + | Packed* | 424 | 800 | 5.6 | 100 | 39.0 | 66.8 | 86.2 | 124 | 5.3 | 134 |
| Monagas 650 F. + | Packed* | 424 | 800 | 4.8 | 100 | 15.7 | 71.1 | 82.9 | 144 | 5.8 | 135 |
| Monagas 650 F. + | Packed* | 424 | 800 | 4.0 | 100 | 21.0 | 73.1 | 82.5 | 143 | 4.5 | 136 |
| Monagas 650 F. + | Packed* | 424 | 800 | 4.6 | 100 | 9.5 | 78.3 | 75.9 | 184 | 5.9 | 138 |

*Packed with Intalox 55 25 mm tower packing.

tor having upper, intermediate, and lower portions comprising the steps of:

(a) blending a minor amount of the total solvent with the feed;

(b) introducing at least a portion of the blend from step (a) into an intermediate portion of the contactor; and (c) introducing the remainder of the solvent into the lower portion of the contactor, wherein the extraction is carried out under supercritical conditions with respect to the solvent employed.

2. The process of claim 1 wherein the hydrocarbon values are contained in an extract phase, which phase is removed from the upper portion of the contactor and wherein raffinates are removed from the lower portion of the contactor.

3. The process of claim 2 in which the amount of solvent used in step (a) is about 20–30 percent of the total solvent employed.

4. The process of claim 1 wherein the solvent is n-pentane.

5. The process of claim 1 wherein the solvent is a mixed $C_5$ stream.

6. The process of claims 1 or 4 wherein the total solvent/feed ratio is about 2:1 to about 6:1 by weight.

7. The process of claim 1 wherein said solvent is used at a total solvent/feed ratio of about 2.5:1 to about 5:1 by weight.

8. The process of claim 7 wherein the solvent/feed ratio is about 2.5:1.

9. The process of claim 1 wherein a portion of the blend from step (a) is also introduced into another intermediate portion of the contactor.

10. The process of claim 1 wherein the blend from step (a) is introduced into the contactor at a plurality of feed locations in the contactor.

11. A process according to claim 1 where said contactor contains segmental baffle trays.

12. A process according to claim 7 where said carbonaceous feedstream is contacted in a extraction column containing segmental baffle trays.

13. A process according to claim 7 where the residence time for said contacting ranges from about 10 to about 40 minutes.

14. A process according to claim 7 where a portion of the blend from step (a) is also introduced into another intermediate portion of the contactor.

* * * * *